Patented Nov. 17, 1936

2,061,104

UNITED STATES PATENT OFFICE 2,061,104

AZO DYESTUFFS

Hans Roos, Leverkusen-I. G.-Werk, Germany, assignor to General Aniline Works, Inc., New York, N. Y., a corporation of Delaware No Drawing. Application June 5, 1935, Serial No. 25,180. In Germany June 23, 1934

3 Claims. (Cl. 260—77)

The present invention relates to new azodyestuffs, more particularly it relates to azodyestuffs which may be represented by the probable general formula

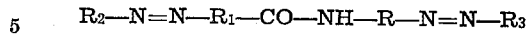

$R_2-N=N-R_1-CO-NH-R-N=N-R_3$

In the said general formula $-NH-R-N=$ stands for the radical of a meta or para diamine of the benzene series, $R_1$ stands for a radical of the benzene series, $R_2$ stands for the radical of an aromatic o-hydroxy-carboxylic acid, such as salicylic acid or a cresotinic acid and $R_3$ stands for the radical of a 2-(aminoaroylamino)-5-hydroxynaphthalene-7-sulfonic acid.

My new dyestuffs are obtainable by tetrazotizing an aminoaroyl-m- or p-arylenediamine, such as p- or m-aminobenzoyl-m- or p-phenylenediamine, 1-amino-4-(4'-aminobenzoyl)-amino-2-methoxy-benzene or 1-amino-4-(3'-amino-4'-methoxybenzoyl)-aminobenzene, coupling the tetrazo compound with one equimolecular proportion of an aromatic o-hydroxycarboxylic acid and after this with one equimolecular proportion of a 2-(aminoaroylamino)-5-hydroxynaphthalene-7-sulfonic acid.

My new dystuffs are in form of their alkali metal salts generally orange to red powders, dyeing the vegetable fiber generally orange to red shades. They can be diazotized on the fiber and coupled with the usual developers, such as β-naphthol or 1-phenyl-3-methyl-5-pyrazolone. The dyeings obtained with the aid of my new dyestuffs are distinguished by good fastness properties, and especially by good dischargeability, both with a neutral and an alkaline discharge paste.

The invention is illustrated by the following example, without being limited thereto:

*Example.*—22,7 parts of p-aminobenzoyl-p-phenylenediamine are tetrazotized in a solution of 1400 parts of water and 56 parts of 10-N-hydrochloric acid with 13,8 parts of sodium nitrite at a temperature of 0° C. Into the diazo solution there is poured a solution of 13,8 parts of salicylic acid and 56 parts of sodium carbonate in 100 parts of water. After half an hour's stirring a thick yellow paste is formed and the salicylic acid can no longer be detected. To the coupling mixture there is added a solution of 37,5 parts of p-aminobenzoyl-methyl-J-acid in 11 parts of sodium carbonate and 200 parts of water. The coupling is soon complete. There is obtained a dyestuff having in the free state the following formula

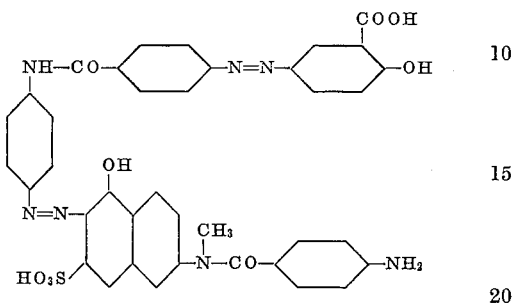

dyeing cotton clear red shades which can be diazotized on the fiber and developed with β-naphthol, yielding dyeings fast to washing which can be discharged both with a neutral and an alkaline reacting discharge paste.

If as second coupling component there is used p-aminobenzoyl-J acid, there is obtained a dyestuff yielding more bluish-red shades and having otherwise similar tinctorial properties.

A dyestuff yielding clear red shades is obtained by coupling tetrazotized m-aminobenzoyl-m-phenylenediamine with one molecular proportion of salicylic acid and one molecular proportion of p-aminobenzoyl-J-acid.

I claim:

1. Azodyestuffs of the general formula

$R_2-N=N-R_1-CO-NH-R-N=N-R_3$ wherein $-NH-R-N=$ stands for the radical of a meta or para diamine of the benzene series, $R_1$ for a radical of the benzene series, $R_2$ for the radical of an aromatic o-hydroxy-carboxylic acid, and $R_3$ for the radical of a 2-(aminoaroylamino)-

5-hydroxynaphthalene-7-sulfonic acid, dyeing the vegetable fiber generally orange to red shades of good dischargeability, both with a neutral and an alkaline discharge paste.

2. Azodyestuffs of the general formula

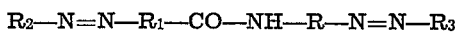

wherein —NH—R—N= stands for the radical of meta or para phenylene diamine, $R_1$ for a radical of the benzene series, $R_2$ for the radical of a member of the group consisting of salicylic acid and cresotinic acid, and $R_3$ for the radical of a 2-(aminoaroylamino) - 5 - hydroxynaphthalene -7- sulfonic acid, dyeing the vegetable fiber generally orange to red shades of good dischargeability, both with a neutral and an alkaline discharge paste.

3. The dyestuff having in the free state the following formula:

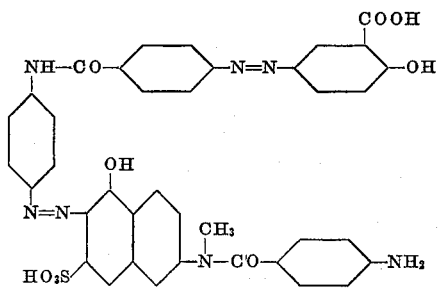

dyeing the vegetable fiber generally clear red shades of good dischargeability, both with a neutral and an alkaline reacting discharge paste.

HANS ROOS.